United States Patent [19]

Ikeda et al.

[11] Patent Number: 4,461,027

[45] Date of Patent: Jul. 17, 1984

[54] CHARACTER SEPARATING SYSTEM IN USE FOR AN OPTICAL CHARACTER READER

[75] Inventors: Tsutomu Ikeda; Masanori Iwamoto, both of Tokyo; Shuji Kizu, Yokohama, all of Japan

[73] Assignee: Tokyo Shibaura Denki Kabushiki Kaisha, Kawasaki, Japan

[21] Appl. No.: 327,707

[22] Filed: Dec. 4, 1981

[51] Int. Cl.$^3$ ............................................. G06K 9/34
[52] U.S. Cl. ......................................... 382/9; 382/50
[58] Field of Search .................. 382/9, 48, 45, 28, 50, 382/11, 13, 18, 19, 24, 37, 38

[56] References Cited

U.S. PATENT DOCUMENTS 4,206,442  6/1980  Miyazaki et al. ..................... 382/9

FOREIGN PATENT DOCUMENTS 50-15536  6/1975  Japan .

Primary Examiner—John C. Martin
Assistant Examiner—Michael D. Parker
Attorney, Agent, or Firm—Cushman, Darby & Cushman

[57] ABSTRACT

A postal code pattern video signal obtained by optically scanning the postal code area is converted, by a quantitizing circuit, into binary data, i.e. single bit pattern data. The video signal is also converted into multibit pattern data by a A/D converter. The single and multibit pattern data are stored in the single and multibit pattern memories, respectively. The single bit pattern data is masked by the character detecting circuit to set an address of a mask corresponding to chained characters. The multibit pattern memory is designated by the address, so that the multibit pattern data corresponding to the chained characters is read out. The words of multibit pattern data are accumulated for each line, and the lowest level data is detected from the accumulated data as the connecting portions. At the connecting portion, the chained character is separated.

3 Claims, 8 Drawing Figures

S0 : INITIAL ADDRESS OF MULTIBIT PATTERN MEMORY
S1 : {S0+X21×(M×N)}+Y $S2 = S1 + j \times (M + N)$

CHARACTER SEPARATING SYSTEM IN USE FOR AN OPTICAL CHARACTER READER

BACKGROUND OF THE INVENTION

The present invention relates to a character separating system for use in an optical character reader, which is for separating characters one by one prior to a character recognition.

The optical character reader is used for optically reading postal codes on postal items, for example. In the character reader of this type, characters (numbers) of the postal code are separated one by one prior to the recognition process of characters of the postal code. In a prior art optical character reader, the postal code of the postal item is scanned by an optical scanner to provide pattern signals corresponding to the postal code. The pattern signals are quantized through a quantitizing circuit thereby to form a quantitized postal code pattern. Then, the quantitized postal code pattern is separated for each character (i.e. each number). In such an approach for separating the quantitized pattern character by character, it is impossible to separate correctly the characters unless the characters are clearly delineated. In general, the separation of characters of the postal code are unclear due to their blot, peculiarities of handwriting, stains on the postal item, etc. In this case, some series-arranged characters are erroneously recognized as a single character. If the chained characters are separated on the basis of the quantitized pattern, its separation accuracy is unsatisfactory and it is frequently impossible to recognize the characters separated.

SUMMARY OF THE INVENTION

Accordingly, an object of the present invention is to provide a character separating system in use for an optical character reader which can separate chained characters with a high precession.

A character separating system for an optical character reader according to the present invention is provided a single bit pattern memory for storing a single bit pattern corresponding to a pattern containing a plurality of characters and a multibit pattern containing data representing gray levels of the corresponding pattern. Coordinates of characters and chained characters contained in the pattern in the single bit pattern memory are detected. An address of a multibit pattern memory is designated by the detected coordinate to thereby detect a multibit pattern corresponding to the chained characters. The data of the detected multibit pattern is vertically calculated to form a vertical projection signal. The trough of the vertical projection signal are detected as the character separating point where the chained character pattern is separated.

DETAILED DESCRIPTION OF THE PREFERRED EMBODIMENTS

Figure 1:
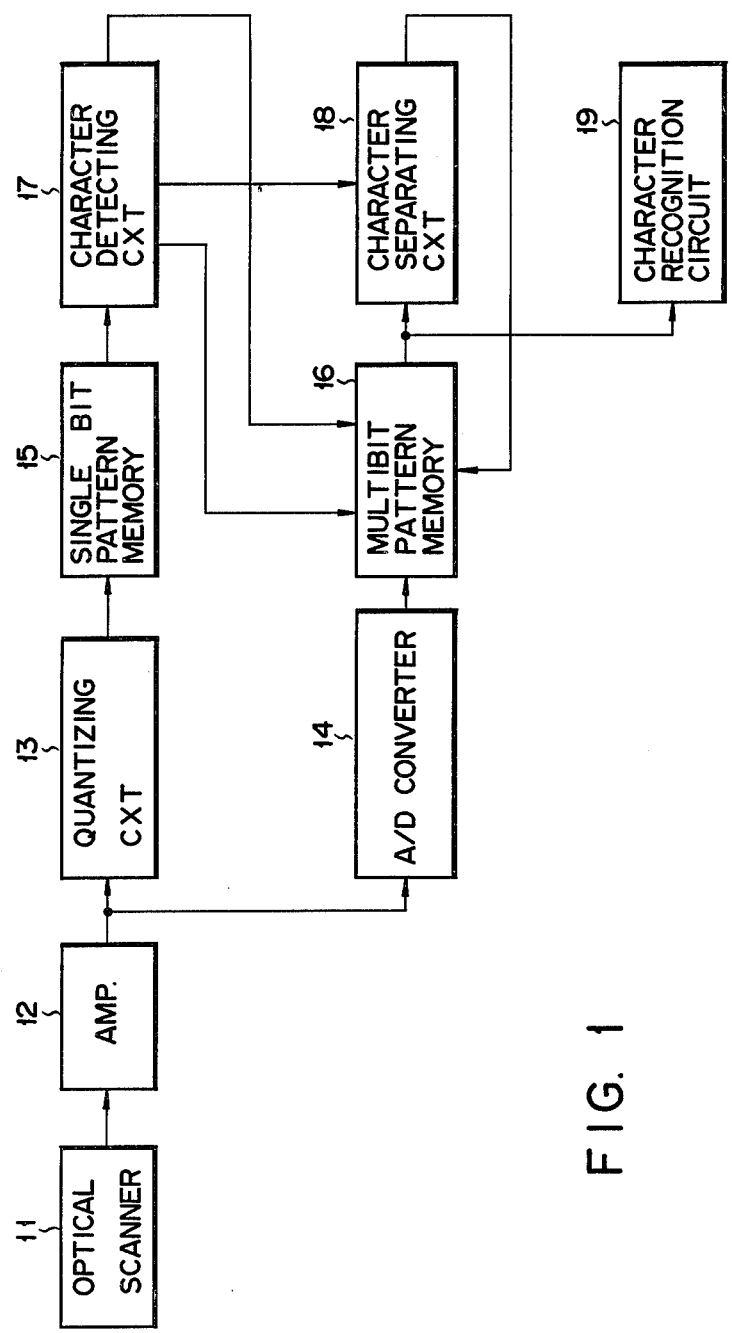
FIG. 1 is a circuit diagram of an optical character reader using a character separating system according to an embodiment of the present invention.

In FIG. 1, and optical scanner 11 is connected at the output terminal to input terminals of a quantitizing circuit 13 and the A/D converter 14, through an amplifier 12. Output terminals of the quantitizing circuit 13 and the A/D converter 14 are respectively connected to write terminals of a single bit pattern memory 15 and a multibit pattern memory 16. A read terminal of the single bit pattern memory 15 is connected to an input terminal of a character detecting circuit 17. A coordinate address output terminal of the character detecting circuit 17 is connected to an address terminal of a multibit pattern memory 16. Its chained detecting signal output terminal is connected to a chained signal input terminal of a character separating circuit 18. A read terminal of the multibit pattern memory 16 is connected to an input terminal of the character separating circuit 18. An output terminal of the character separating circuit 18 is connected to an address terminal of the multibit pattern memory 16. The read terminal of the multibit pattern memory 16 is connected to a character recognition circuit 19.

Figure 2:
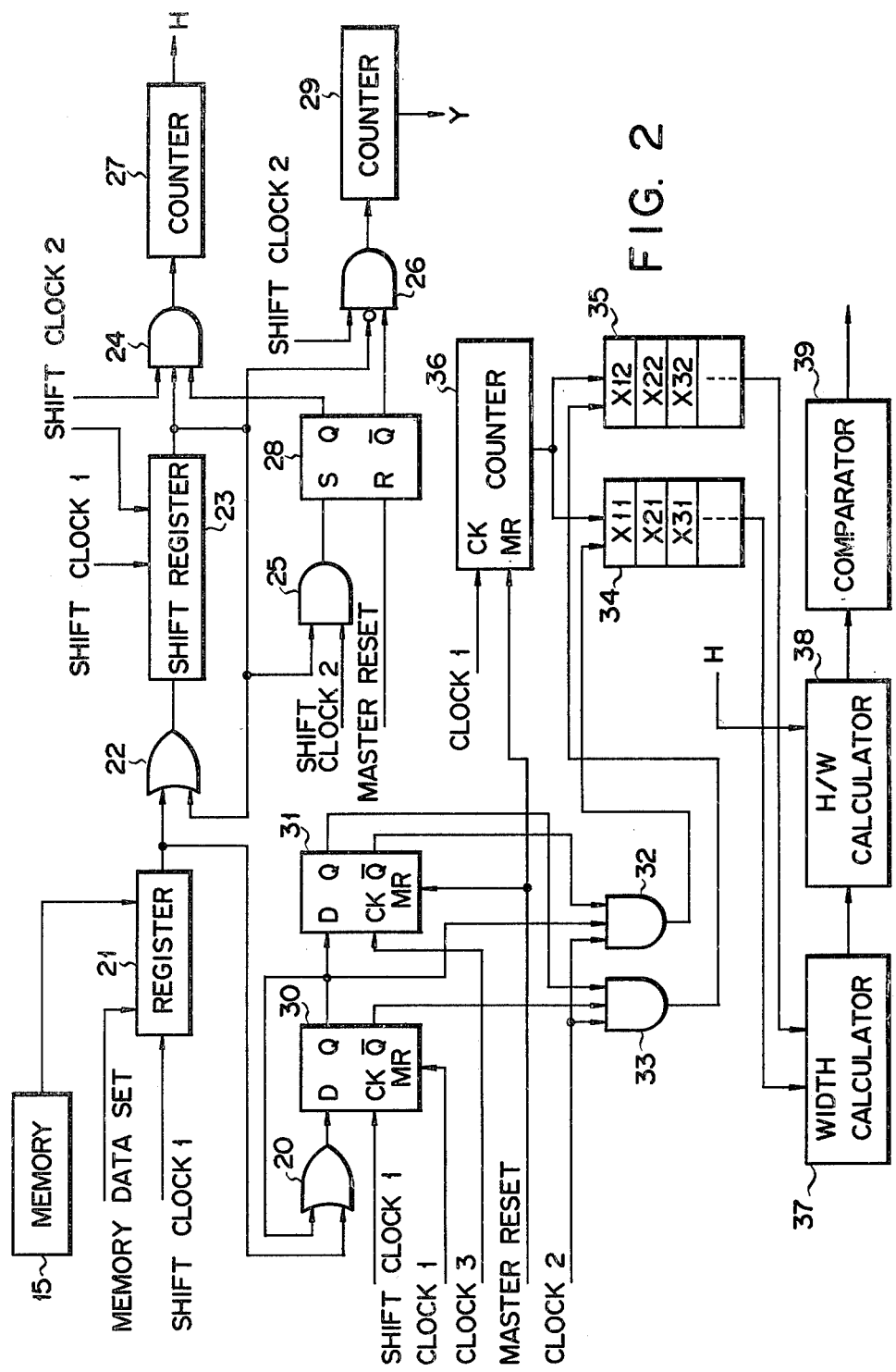
FIG. 2 is a circuit diagram of the character detecting circuit shown in FIG. 1.

Turning now to FIG. 2, there is shown a circuit arrangement of the character detecting circuit 17. In the figure, a read output terminal of the single bit pattern memory 15 is connected to an input terminal of a memory data register 21 for sequentially storing the single bit pattern from the memory 15 word by word. The output terminal of the register 21 is connected to one of the input terminals of each of OR gates 22 and 20. An output terminal of the OR gate 22 is connected to an input terminal of a shift register 23. An output terminal of the shift register 23 is connected to the other input terminal of the OR gate 22 and to input terminals of AND gates 24, 25 and 26. The shift register 23 serves as a ring counter for circulating therethrough data via the OR gate 22. The output terminal of the AND gate 24 is connected to an input terminal of a counter 27 for measuring a height of a character. The output terminal of the AND gate 25 is connected to a set terminal S of an RS flip-flop 28. The output terminals Q and $\bar{Q}$ of the RS flip-flop 28 are respectively connected to input terminals of the AND gates 24 and 26. The output terminal of the AND gate 26 is connected to an input terminal of a counter 29 for measuring a Y coordinate on the upper end of the character area.

An output terminal of the OR gate 20 is connected to an input terminal D of a D flip-flop 30, and an output terminal Q of the D flip-flop is connected to the other input terminal of the OR gate 20, an input terminal D of the D flip-flop 31 and the input terminal of the AND gate 32. An output terminal $\bar{Q}$ of the D flip-flop 30 is connected to an input terminal of the AND gate 33. The output terminals $\bar{Q}$ and Q of the D flip-flop 31 are connected to input terminals of the AND gates 32 and 33, respectively. The output terminals of the AND gates 32 and 33 are connected to read trigger terminals of a left coordinate memory 34 and a right coordinate memory 35. An output terminal of a line counter 36 is connected to an address terminal of each of the memories 34 and 35. Read terminals of the memories 34 and 35 are connected to a width calculator 37. An output terminal of the width calculator 37 is connected to an input terminal of an H/W calculator 38 for calculating a ratio of height to width. An output terminal of the H/W calculator 38 is connected to an input terminal of a comparator 39 for comparing a value of H/W with a reference value.

The operation of an optical character reader thus arranged will be described.

Figure 3:
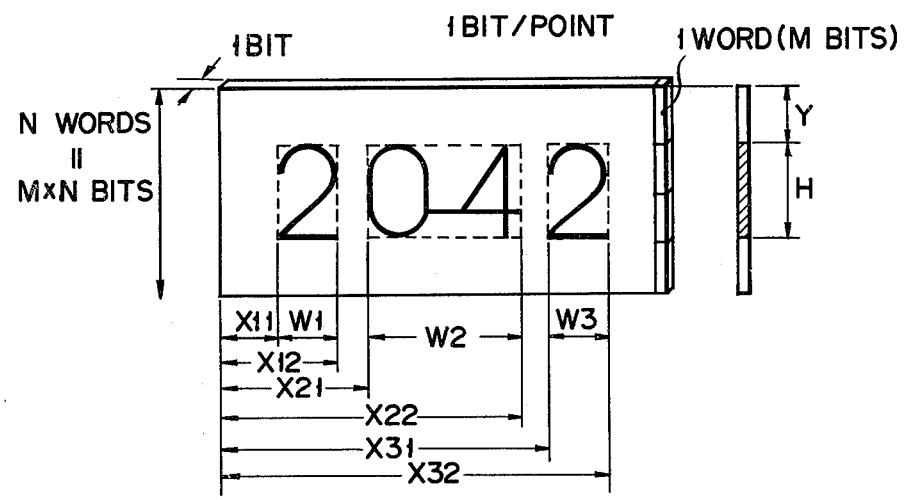
FIG. 3 illustrates a single bit pattern stored in a single bit pattern memory shown in FIG. 1.
Figure 4:
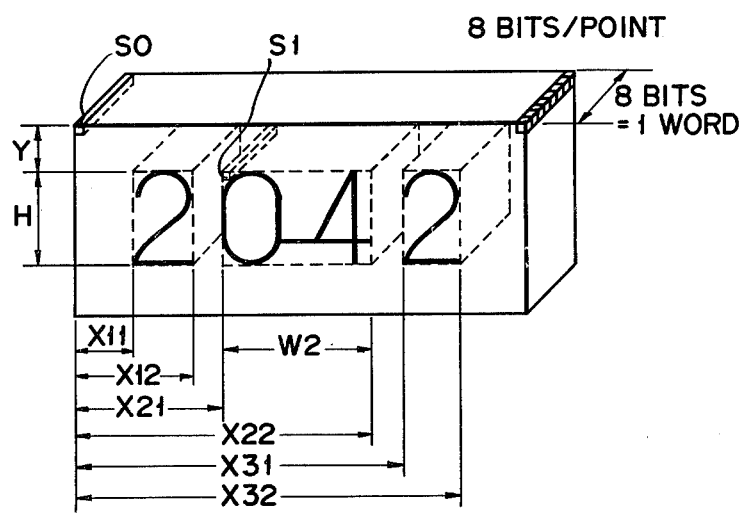
FIG. 4 illustrates a multibit pattern stored in the multibit pattern memory shown in FIG. 1.

When the optical scanner 11 scans a code section of a postal item, the optical scanner 11 produces a video signal corresponding to a pattern of the code section. The video signal from the optical scanner is amplified by the amplifier 12 and the amplified one is applied to the quantitizing circuit 13 and the A/D converter 14. The quantitizing circuit 13 quantitizes the video signal into binary data which in turn is applied to the single bit pattern memory 15 in the form of single bit pattern data. The A/D converter 14 converts the video signal into a digital video data and the converted digital video data is applied to the multibit pattern memory 16 in the form of the multibit pattern data. The single bit pattern memory 15 stores the single bit pattern data bit by bit, as shown in FIG. 3. The pattern memory 15 stores X line data in the X direction, each line data including N (e.g. 4) words each containing M (e.g. 8) bits, which are arranged in the Y direction. The multibit pattern memory 16 stores the multibit pattern data of which each bit is expressed by an 8-bit word, as shown in FIG. 4. One word of the pattern data stored in the memory 16 describes gray levels of the pattern from 0 to 255 (maximum).

Figure 5:
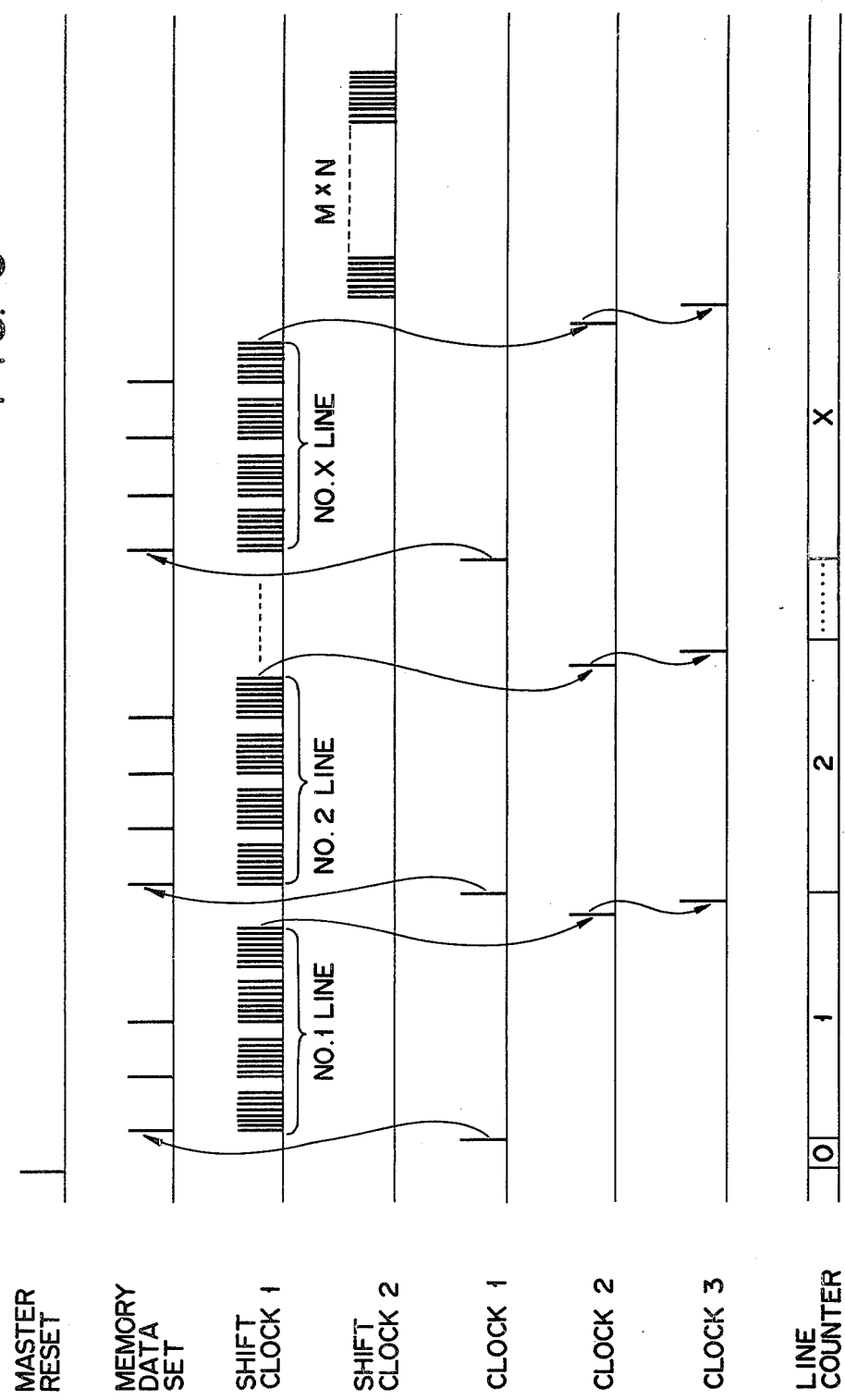
FIG. 5 illustrates a time chart for explaining the sequence of operations of the character detecting circuit shown in FIG. 2.

The single bit pattern data of the single bit pattern memory 15 is transferred to a character detecting circuit 17. The character detecting circuit 17 detects numbers of the postal code from the single bit pattern data. The character detection will be described referring to the circuit shown in FIG. 2 and the time chart of FIG. 5. Firstly, the RS flip-flop 28, D flip-flop 31 and the line counter 36 are reset by the master reset pulse. Then, a clock 1 is generated to count up the line counter 36. Flip-flop 30 is reset by the clock 1 pulse. Further, a memory data set signal sets one word of the single bit pattern data from the memory 15 into a register 21. The data set is read out bit by bit from the register 21 in synchronism with the shift clock 1, and is transferred to the shift register 23 through the OR gate 22. The data of the register 21 is inputted into the terminal D of the D flip-flop 30 by way of the OR gate 20. In this way, the data is transferred word by word from the memory 15 to the register 21, and further is transferred to the shift register 23 and the D flip-flop 30, through the OR gates 22 and 20. When the data of four words or one line are loaded into the shift register 23, the data of No. 1 line is stored into the shift register 23. For reading out the data of No. 2 line, the clock 1 is generated again and the line counter 36 is further counted up by one. When the No. 2 line data is inputted into the shift register 23 through the register 21 and the OR gate 22, the No. 1 line data of the shift register 23, together with the No. 2 line data, is transferred to the shift register 23, through the OR gate 22. Accordingly, the sum data of the No. 1 line data and the No. 2 line data are stored in the shift register 23.

Of the line data of the memory 15, these data up to No. X11 are in white or 0 level, and accordingly all bits of the shift register are weighted at 0. In the No. X11 line, if the bit data in black or 1 level is read out from the memory 15, the bit data "1" is inputted into the terminal D of the D flip-flop 30 via the OR gate 20. The D flip-flop 30 holds the bit data "1" and produces at the output terminals Q and $\bar{Q}$ "1" and "0", respectively. At this time, "0" and "1" have appeared at the output terminals Q and $\bar{Q}$ of the D flip-flop 31. Accordingly, the AND gate 32 produces a "1" signal in synchronism with the clock 2. In response to the "1" signal of the AND gate 32, the count of the line counter 36, i.e. X11, is stored in the memory 34. In the range from the No. X11 line to No. X12 line, the bit data "1" is produced every line. Accordingly, the D flip-flops 30 and 31 keep "1", with the result that the AND gates 32 and 33 produce no "1" signal and the memories 34 and 35 perform no storing operation. When the data of No. X12 line is inputted from the register 21 to the terminal D of the D flip-flop 30 through the OR gate 20, the output Q of the D flip-flop 30 becomes "0" in level, while the output $\bar{Q}$ becomes "1". Nevertheless, the D flip-flop 31 still keeps the previous state. Accordingly, the output signal from the AND gate 33 is "1" and the count, X12, of the counter 36 is stored into the memory 35. In this way, the line data till the No. XN line are read out from the memory 15 and the read out one is supplied through the register 21 and the OR gate 20 to the D flip-flop 30. Upon the supply of the data, the data of the line number, X11, X12, X21, X22, X31, X32, . . . , are stored into the D flip-flop 30. At this time, the data formed by horizontally projecting the pattern of the code section has been stored in the shift register 23. When the projection data in the shift register 23 is read out in synchronism with the shift clock 2, the AND gate 26 transfers pulses to the counter 29 in synchronism with the shift clock 2. The counter 29 counts the value of Y in FIG. 3. When the output data from the shift register 23 becomes "1" in level, the AND gate 25 set the RS flip-flop 28. As a result, the outputting of the AND gate 26 stops, and the counting operation of the counter 29 stops. The AND gate 24 transfers "1" bit data from the shift register 23 to the counter 27, so that the counter 27 counts the "1" bit data up to the value of H in FIG. 3.

Meanwhile, the coordinate data in the left and right coordinate memories 34 and 35 are read out and inputted into the width calculator 37. The width calculator 37 calculates X12-X11, X22-X21, and X32-X31 to obtain the character widths W1, W2 and W3. The width data W1, W2 and W3 of the width calculator 37 are inputted into the H/W calculator 38. The H/W calculator 38 calculates a height-to-width ratio from the height H and the width W1, W2 and W3. The results of the calculations, H/W1, H/W2 and H/W3, are inputted into the comparator 39 where it is compared with a predetermined H/W ratio. When the calculated H/W ratio falls off the predetermined one, the comparator 39 produces a detecting chained signal representing a chain of a plurality of characters. The detecting chained signal is transferred to a character separating circuit 18 which in turn responds to the detecting chained signal to separate characters. The characters of which the H/W ratio falls within the predetermined ratio, that is, numerals 2 with the widths W1 and W3, are judged to be recognizable. As a result, the address data of masks masking these numerals are transferred to the multibit pattern memory 16. The multibit pattern memory 16 addressed by the address data produces from the designated addresses the characters, or the two separated numerals "2", for transfer to the recognition circuit 19.

Figure 6:
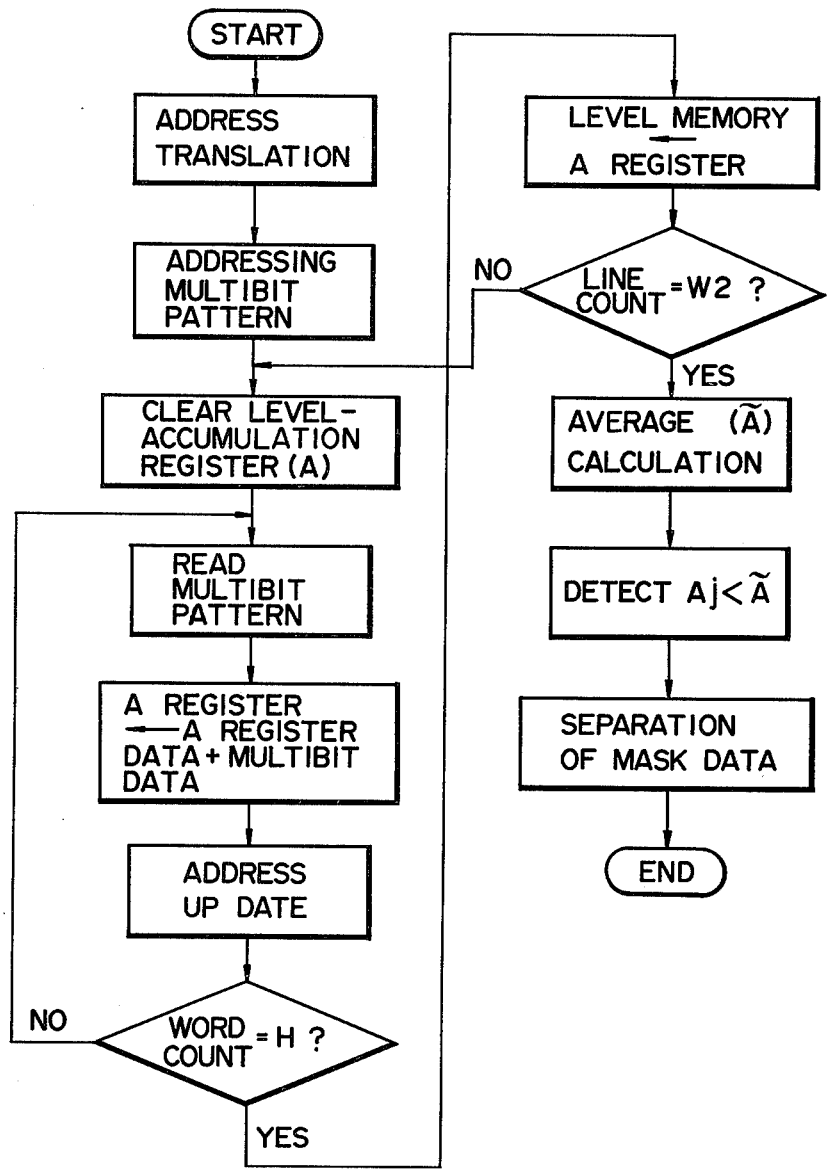
FIG. 6 illustrates a flow chart useful in explaining the operation of te character separating circuit shown in FIG. 1.

A character separating process by the character separating circuit 18 will be described referring to a flow chart shown in FIG. 6. Following a start, the coordinates of the single bit pattern memory 15 corresponding to the chained characters detected by the character detecting circuit 17 is translated into the address of the multibit pattern memory 16. This translation is performed by following formula $$S1 = \{S0 + X21 \times (M \times N)\} + Y,$$

where
S1 is left-top point address of chained characters mask
S0 is the initial address of multibit pattern memory 16
X21 is the horizontal coordinate of the left-top point of chained characters mask.
Y is the vertical coordinate of the left-top point of chained characters mask.
$(M \times N)$ is the number of points in one vertical line.

Figure 7:
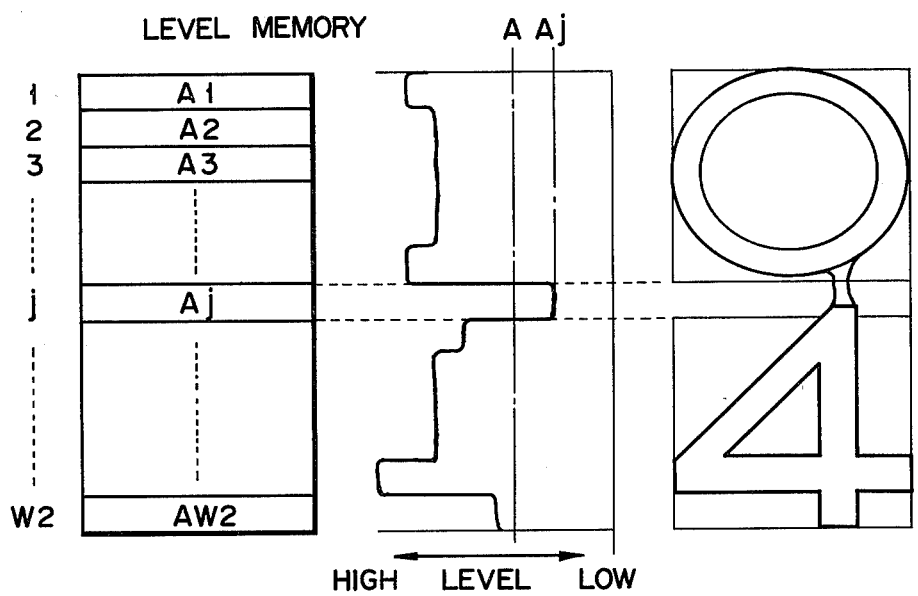
FIG. 7 is a set of diagrams for explaining separating points of chained characters.
Figure 8:
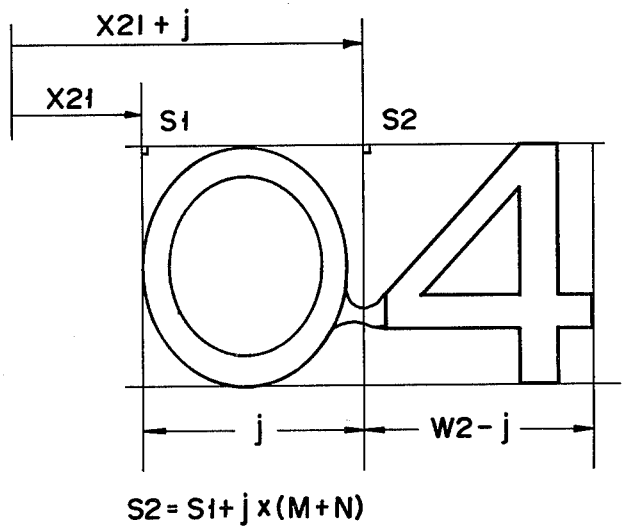
FIG. 8 illustrates addresses of the separated characters.

In the formula above, the coordinates X21 and Y are detected by using the single bit pattern. After the address translation, the multibit pattern memory 16 is addressed. Then, a level accumulation register, or an A register (not shown), for accumulating the level data of 8 bits for each line is cleared. The multibit pattern data are sequentially read out word by word from the address designated, or the coordinate address of X21 and Y, and inputted into the A register. When the level data of one word is loaded into the A register, the address of the address counter is updated. In the next step, it is judged whether or not the count of the address counter is equal to the height H of the character. When the judgment in NO, the level data in the next address is read out from the memory 16. The level data is accumulated to the previous level data in the A register. In this way, the level data of one line, or the level data corresponding to the height H are accumulated and the accumulated data is stored as the accumulated level data A1 in the address 1 of the level memory (FIG. 7). Then, the judgement of LINE COUNT=W2 is performed. When the judgement is NO, the level data of the next line is read out from the memory 16. In this way, the level data of the lines corresponding to the character width W2 are read out and a mean $\bar{A}$ of the level data A1 to AW2 is calculated. Level data Aj with the level value smaller than the mean value $\bar{A}$ is searched from the data A1 to AW2 stored in the level memory to find a corresponding address j. As shown in FIG. 7, the level data Aj at the connecting portion of the character chain exhibits a relatively low level. If the address j storing the level data Aj is detected, a connection position of the character chain, i.e. a separation position, can be detected. The coordinates of the characters to be separated are obtained by the address j and the address X21. These coordinates are illustrated in FIG. 8. The coordinate of a start point S1 for masking the first character 0 of the character chain is defined by X21 and Y, and a start point S2 of a mask for the next character 4 is defined by X21+j and Y. The pattern data with lines ranging from the start point S1 to j are read out from the memory 16. Then, the pattern data with the lines ranging from the start point S2 to W2-j are read out from the memory 16. In this way, the chained characters are separated into two characters. The separated character data is inputted into the character recognition circuit 19. The character recognition circuit 19 recognizes four characters containing those separated ones in accordance with an ordinary character recognition procedure.

The video signal of the pattern corresponding to the characters to be recognized is converted into the single bit pattern data and the multibit pattern and stored in the single bit pattern memory and the multibit pattern memory, respectively. The horizontal and vertical projection data, which are read out from the single bit pattern memory, are formed and the address of the chained character area is calculated from the projection data. The multibit pattern memory is addressed by the address in the chained character and the multibit pattern data in the chained character area addressed is read out from the multibit pattern memory. The accumulated level data for each line is obtained from the multibit pattern data read out and the address corresponding to the accumulated level data below the means value is judged as a separation point. The chained characters are separated at the separation point. According to the character separation system, the separation point is detected depending on the level of the projection data of the character pattern. Accordingly, if the chained characters are detected being coupled with one another due to spot, stain, dust and the like, the levels at one or more coupling portions of the chained characters are almost in low level. Therefore, the one or more coupling portions can be detected with relatively high precision.

In the above-mentioned embodiment, the multibit data is accumulated for each line to form accumulated level data. Alternatively, only the multibit data, which has the maximum level in those multibit data for each line, is detected to form a projection pattern, unlike the above-mentioned embodiment. The trough is detected from the projection pattern. The character separation is made at the address of the trough. Also in the above-mentioned embodiment, the present invention was applied for the typed characters or the printed postal codes. However, the present invention is applicable for separating the hand-written chained postal numbers and any other characters as well.

What we claim is:
1. A character separating system for an optical character reader comprising:
means for producing a video signal corresponding to a character pattern containing chained characters;
first converting means, coupled to said producing means, for converting the video signal into a binary signal having single bit pattern data;
second converting means, coupled to said producing means, for converting said video signal into multibit pattern data representing signal levels of the video signal;
judging means for judging whether the pattern data corresponding to said chained characters are present in the single bit pattern data from said first converting means;
means, responsive to a result of judgement by said judging means that the chained characters are present, for extracting chained character pattern data corresponding to said chained character from the multibit pattern data of said second converting means, and detecting at least one connecting portion of the chained characters from the signal levels of the chained character pattern data; and means for separating said chained characters at said connecting portion, the single bit pattern data from said first converting means and the multibit pattern data from said second converting means being stored into a single bit pattern memory and a multibit pattern memory, respectively, said judging means including means for forming horizontal and vertical projection data on the basis of the single bit pattern data read out from said single bit pattern memory, means for forming a mask of the pattern data corresponding to said chained characters on the basis of the projection data from said projection data means, and means for judging whether the chained characters are present or not on the basis of a size of said mask, said projection data means of said judging means including means for storing in a circulating manner the single bit data read out for each line from said signal bit pattern memory to form the horizontal projection data, and means for counting lines read out for each line from said single bit pattern memory to form the vertical projection data said mask forming means of said judging means including means for calculating a height (H) by the horizontal projection data from said horizontal projection means and means for calculating a width (W) of said mask from the vertical projection data of said vertical projection means, said judging means including means for calculating a ratio of the height (H) to the width (W) of said mask, and comparing means for comparing the ratio from said calculating means with a reference value to judge as to whether the chained characters are present or not.

2. A character separating system for an optical character reader comprising:

means for producing a video signal corresponding to a character pattern containing chained characters;

first converting means, coupled to said producing means, for converting the video signal into a binary signal having single bit pattern data;

second converting means, coupled to said producing means, for converting said video signal into multibit pattern data representing signal levels of the video signal;

judging means for judging whether the pattern data corresponding to said chained characters are present in the single bit pattern data from said first converting means;

means, responsive to a result of judgement by said judging means that the chained characters are present, for extracting chained character pattern data corresponding to said chained character from the multibit pattern data of said second converting means, and detecting at least one connecting portion of the chained characters from the signal levels of the chained character pattern data; and means for separating said chained characters at said connecting portion said connecting portion detecting means comprising means for accumulating the pattern data corresponding to said chained characters of the multibit pattern data from said second converting means, thereby to form the accumulated level data, means for calculating a mean value $\bar{A}$ of the accumulated level data of said accumulating means, and means for detecting the accumulated level data lower than the means value $\bar{A}$ as the connection portion.

3. A character separating system for an optical character reader comprising:

means for producing a video signal corresponding to a character pattern containing chained characters;

first converting means, coupled to said producing means, for converting the video signal into a binary signal having single bit pattern data;

second converting means, coupled to said producing means, for converting said video signal into multibit pattern data representing signal levels of the video signal;

judging means for judging whether the pattern data corresponding to said chained characters are present in the single bit pattern data from said first converting means;

means, responsive to a result of the judgement by said judging means that the chained characters are present, for extracting chained character pattern data corresponding to said chained character from the multibit pattern data of said second converting means, and detecting at least one connecting portion of the chained characters from the signal levels of the chained character pattern data; and means for separating said chained characters at said connecting portion said connecting portion detecting means includes mean for detecting bit data in the highest level for each line from the pattern data corresponding to said chained characters of the multibit pattern data of said second converting means, and means for detecting the lowest level bit data of the maximum level bit data detected by said detecting means as the connection portion.

* * * * *